(12) United States Patent
Seaborn et al.

(10) Patent No.: US 11,558,399 B2
(45) Date of Patent: Jan. 17, 2023

(54) NETWORK TRANSMISSION PATH VERIFICATION

(71) Applicant: International Business Machines Corporation, Armonk, NY (US)

(72) Inventors: Mark Duane Seaborn, Algonquin, IL (US); Amit Lamba, Buffalo Grove, IL (US); Jason Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/587,576

(22) Filed: Sep. 30, 2019

(65) Prior Publication Data

US 2021/0099464 A1    Apr. 1, 2021

(51) Int. Cl.
*H04L 9/40* (2022.01)
*H04L 45/74* (2022.01)

(52) U.S. Cl.
CPC .......... *H04L 63/126* (2013.01); *H04L 63/123* (2013.01); *H04L 63/1466* (2013.01); *H04L 45/74* (2013.01)

(58) Field of Classification Search
CPC . H04L 63/126; H04L 63/1466; H04L 63/123; H04L 45/74; H04W 12/102
See application file for complete search history.

(56) References Cited

U.S. PATENT DOCUMENTS 8,320,561 B2    11/2012    Barany et al.
8,948,161 B2    2/2015    Furukawa et al.
(Continued)

FOREIGN PATENT DOCUMENTS

CN    106100814 A    11/2016
CN    106851630 A    6/2017
(Continued)

OTHER PUBLICATIONS

Wu et al., "Enabling Efficient Source and Path Verification via Probabilistic Packet Marking," 2018 IEEE/ACM 26th International Symposium on Quality of Service (IWQoS), 2018, pp. 1-10, doi: 10.1109/IWQoS.2018.8624169.*

(Continued)

*Primary Examiner* — Victor Lesniewski
(74) *Attorney, Agent, or Firm* — Edward J. Wixted, III; Gavin Giraud (57) ABSTRACT

A data packet transits through a series of network nodes (a series of intermediate hops) while being transmitted from a source node to a destination node. A network node (router, gateway, server, or any network device) that handles the data packet, adds new information to the file header of the data packet. The new header information identifies the previous and next network nodes in the transmission path. The network node further validates information provided by a previous node, and generates further new header information that attests as to the validity of the information provided by the previous node. The network node secures and signs the new information cryptographically, and adds the new information to the file header. If a malicious actor attempts to tamper with the data packet, or routing thereof, the secured header information renders such tampering discoverable, enabling performance of a responsive action.

16 Claims, 4 Drawing Sheets

(56) References Cited

U.S. PATENT DOCUMENTS

| | | | |
|---|---|---|---|
| 9,077,709 B1* | 7/2015 | Dall | H04L 63/126 |
| 9,712,649 B2 | 7/2017 | Lopez | |
| 10,511,590 B1* | 12/2019 | Bosch | H04L 45/38 |
| 2004/0259529 A1* | 12/2004 | Suzuki | H04W 12/108 |
| | | | 455/411 |
| 2007/0153763 A1* | 7/2007 | Rampolla | H04L 45/22 |
| | | | 370/351 |
| 2008/0075079 A1* | 3/2008 | Smith | H04L 47/10 |
| | | | 370/392 |
| 2014/0198791 A1* | 7/2014 | Lim | H04L 45/00 |
| | | | 370/392 |
| 2014/0245385 A1* | 8/2014 | Singhal | H04L 63/126 |
| | | | 726/3 |
| 2017/0310708 A1* | 10/2017 | Schiappa | H04L 63/20 |
| 2018/0294969 A1* | 10/2018 | Holness | H04L 9/32 |
| 2019/0036818 A1* | 1/2019 | Nainar | H04L 45/74 |
| 2019/0260667 A1* | 8/2019 | Aguado Martín | H04L 45/64 |
| 2019/0349290 A1* | 11/2019 | Pignataro | H04L 43/0847 |
| 2020/0120025 A1* | 4/2020 | Voit | H04W 12/08 |

FOREIGN PATENT DOCUMENTS

| | | |
|---|---|---|
| CN | 105847034 B | 2/2019 |
| KR | 20140077778 A | 6/2014 |

OTHER PUBLICATIONS

Rangarajan and Garcia-Luna-Aceves, "Path verification for robust, instantaneous loop-free routing in ad hoc networks," IEEE Wireless Communications and Networking Conference, 2005, 2005, pp. 2014-2019 vol. 4, doi: 10.1109/WCNC.2005.1424828.*

Sanzgiri et al., "A secure routing protocol for ad hoc networks."; Proceedings of the 10th IEEE International Conference on Network Protocols (ICNP'02), Nov. 2002. (pp. 78-87).

Tschofenig et al., "Transport Layer Security (TLS) / DatagramTransport Layer Security (DTLS) Profiles for the Internet of Things (RFC7925)", An IP.com Prior Art Database Technical Disclosure, IP.com No. IPCOM000246976D, Publication Date: Jul. 1, 2016, 62 pages.

* cited by examiner

NETWORK TRANSMISSION PATH VERIFICATION

BACKGROUND

The present invention relates generally to the field of computer networking security, and more particularly to verifying network transmission paths.

In large scale networks, a request or data packet issued by a source node commonly travels through at least one, and sometimes many, intermediate hops on its path to a destination node. The path taken is determined, at least in part, by routing decisions made independently by network routers along the way, based on such things as load balancing, skirting around outages and bottlenecks, cost considerations, etc.

In an internet-based economy, credentials are exchanged over a network to authorize use of protected resources. Some network protocols use headers to track attributes about a transmission, such as source and destination IP addresses as well as addresses of intermediate nodes (also sometimes herein referred to as intermediate hops) encountered along the transmission path.

SUMMARY

According to an aspect of the present invention, there is a method, computer program product and/or system that performs the following operations (not necessarily in the following order): (i) receiving, by a second node, and through a network from a previous node, a data packet comprising: a cryptographically secured first node identity information that identifies a first node from which the data packet was directed to the second node, a first instance of cryptographically secured second node identity information that identifies the second node to which the first node directed the data packet, and a previous node identity information indicating the identity of the previous node; (ii) determining an inconsistency wherein the first node identity information does not correspond to the previous node identity information; and (iii) in response to determining the inconsistency, performing a responsive action According to a further aspect of the present invention, there is a method, computer program product and/or system that performs the following operations (not necessarily in the following order): (i) receiving, by a second node, and through a network from a previous node, a data packet comprising: a cryptographically secured first node identity information that identifies a first node from which the data packet was directed to the second node, a first instance of cryptographically secured second node identity information that identifies the second node to which the first node directed the data packet, and a previous node identity information indicating the identity of the previous node; (ii) determining: (a) the cryptographically secured first node identity information is consistent with the previous node identity information, (b) the first instance of the cryptographically secured second node identity information is consistent with the identity of the second node, and (c) a path taken by the data packet is verified; and (iii) in response to determining (a), (b) and (c), performing a responsive action.

DETAILED DESCRIPTION

A data packet, sent through a network from a source computer to a destination computer may make any number of intermediate hops along the way, transiting through a corresponding number of network devices (nodes) as it is routed from hop to hop, until reaching the destination. Each network device (router, gateway, server, or any network device) that handles the data packet, adds new information in accordance with embodiments of the present invention, to the data packet header. The new information, among other things, identifies the previous network device and the next one. The network device secures and signs the new information cryptographically. If a malicious actor attempts to tamper with the data packet, or routing thereof, the secured header information, added by at least some of the network devices, renders such tampering discoverable.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
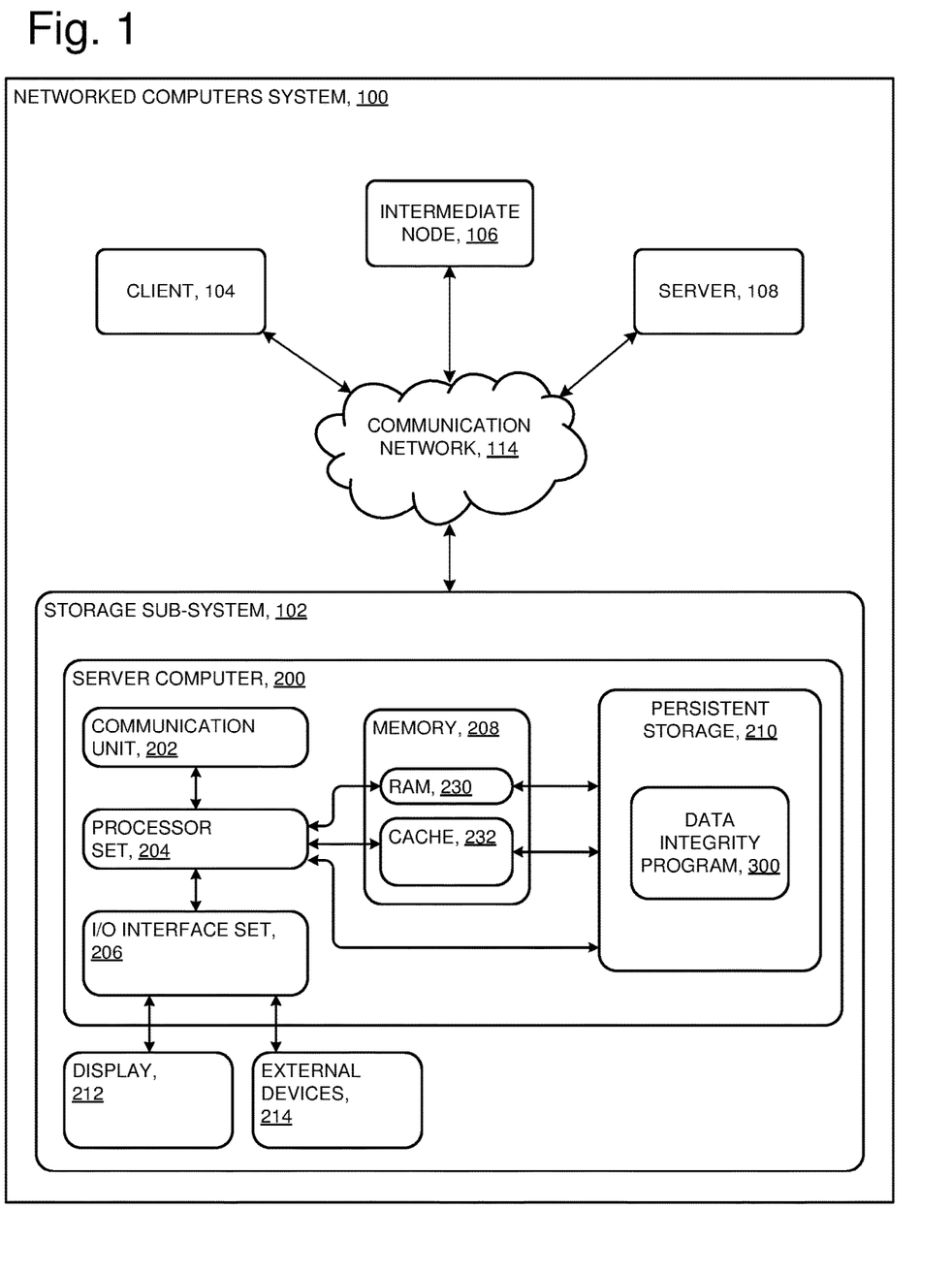
FIG. 1 is a block diagram of a system in accordance with at least one embodiment of present invention.

An embodiment of a possible hardware and software environment for software and/or methods according to the present invention will now be described in detail with reference to the Figures. FIG. 1 is a functional block diagram illustrating various portions of networked computers system 100, including: storage sub-system 102; client 104; intermediate node 106; destination node 108; communication network 114; server computer 200; communications unit 202; processor set 204; input/output (I/O) interface set 206; memory device 208; persistent storage device 210; display device 212; external devices 214; random access memory (RAM) devices 230; cache memory device 232; and data integrity program 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Data integrity program 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for storage sub-system 102; and/or (ii) devices external to storage sub-system 102 may be able to provide memory for storage sub-system 102.

Data integrity program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Data integrity program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, data integrity program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
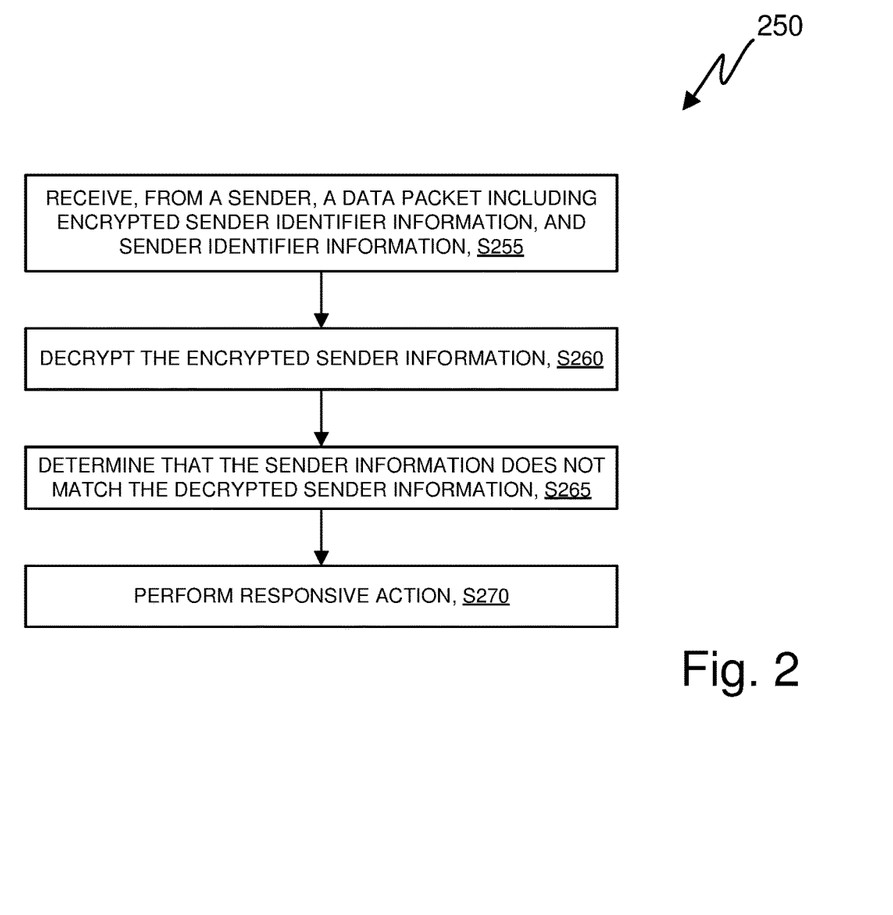
FIG. 2 is a flowchart showing a method in accordance with at least one embodiment of present invention.
Figure 3:
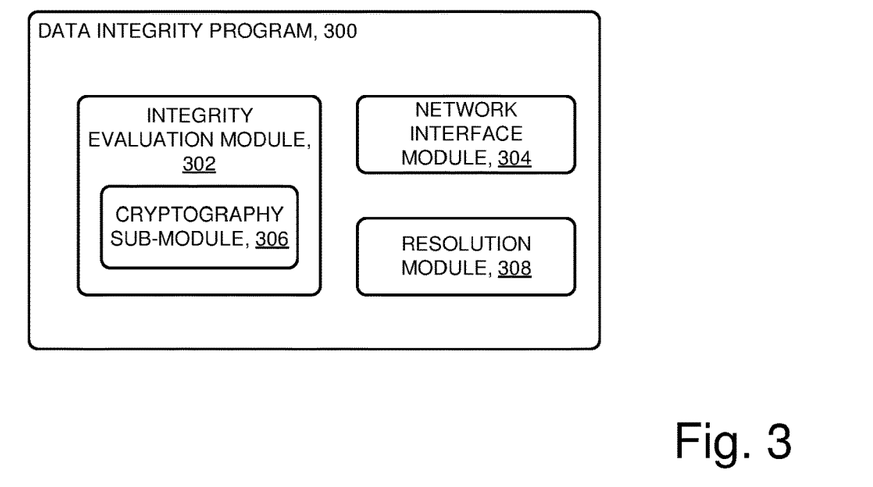
FIG. 3 is a block diagram showing a machine logic (for example, software) portion of a system in accordance with at least one embodiment of present invention.

FIG. 2 shows flowchart 250 depicting a method according to the present invention. FIG. 3 shows data integrity program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where network interface module 304 of server data integrity program 300, receives a data packet sent by client 104 (see FIG. 1), the source node. While in transmission from client 104 to server 108 (from source node to destination node), the data packet makes any number of intermediate hops through a corresponding number of intermediate nodes, such as intermediate node 106 (see FIG. 1), eventually arriving at the destination, server 108. In some embodiments, data integrity program 300, of persistent storage 210, of server computer 200, of storage sub-system 102 is a component of intermediate node 106 (see FIG. 1).

In some embodiments, the data packet is a request sent by a client (the source node) and directed to a server (the destination node) in a client/server context. In some embodiments, the sender is server 108 (the source node), sending back a response to client 104 (the destination node). In some embodiments, the recipient is intermediate node 106 (see FIG. 1) and the sender is the source node or an immediately prior intermediate node along the routing path of the data packet. In some embodiments, the recipient is the destination node, or an intermediate node, and the sender is the sending node or an immediately preceding intermediate node along the routing path of the data packet.

The term "data packet" herein refers to any type of data file such as an email, a secure hypertext transfer protocol (s-http) request, a spreadsheet file, a document file, any type of request (for example, a request in a client/server context), and/or a data packet in a packet switching network, being transmitted through a computer network, such as the internet, from one network device to another, such as from a client computer to a server computer, or vice versa. The data packet includes encrypted and digitally signed information, added in part, by each node that handles the data packet (including the source and intermediate nodes). Further details with respect to the encrypted and digitally signed information is given below in the Further Comments and/or Embodiments sub-section of this Detailed Description section.

In some embodiments, a source node defines the following fields in the header of the data packet: (i) source network identifier; (ii) destination network identifier; (iii) traversed path list (an ordered list of each of the network identifiers of the intermediate hops through which the request has transited); and/or (iv) verification (validation) information list (an ordered list of verification information, added by the source, and each intermediate node through which the request has transited). Further details with respect to the header information is given below in the Further Comments and/or Embodiments sub-section of this Detailed Description section.

In some embodiments, each node in the traversal path of the data packet, including the source node and intermediate nodes, adds certain new information to the data packet header. The new information includes information that identifies the current node (the node currently processing the data packet), and the next node to which the data packet is to be routed. Each node encrypts and digitally signs the new information with a private key and includes a digital signature along with its digital certificate. In some embodiments, the source and intermediate nodes add the encrypted and digitally signed information to the data packet header. In some embodiments, the source and intermediate nodes add, and digitally sign, the information including a digital signature along with its digital certificate as part of the verification information.

Processing proceeds at operation S260, where cryptography sub-module 306, of integrity evaluation module 302, of data integrity program 300 decrypts at least some of the encrypted routing information in the data packet. In some embodiments, cryptography sub-module 306 performs the decryption based, at least in part, on a public key associated with a previous node, and a digital signature applied by the previous node.

Processing proceeds at operation S265 where integrity evaluation module 302, compares identity information with respect to the immediate sender (identity of the actual sender from which the data packet was received), against the decrypted routing information. Based on this comparison, integrity evaluation module 302 determines that the identity of the immediate sender does not match the sender identity encoded in the decrypted routing information. This discrepancy comprises evidence that a malicious actor may have tampered with the data packet and/or the routing through which the data packet traversed.

In some embodiments, integrity evaluation module 302 determines that the identity of the immediate sender matches the sender identity encoded in the routing information. In response: (i) resolution module 308 performs data packet handling operations in accordance with some embodiments of the present invention, including making certain updates to the data packet header; and (ii) network interface module 304 forwards the data packet to the next intermediate node, or to the destination node. With respect to (i) above, data packet handling operations are discussed below, in the Further Comments and/or Embodiments sub-section of this Detailed Description section, under the "Actions performed by intermediate node" heading.

Processing proceeds at operation S270, where resolution module 308, of data integrity program 300, in response to the discrepancy determined in operation S265 above, performs a responsive action. In some embodiments, a responsive action comprises one or more of the following actions, without limitation: (i) rejecting the data packet; (ii) dropping the data packet; (iii) sending, to a source node, a request to re-transmit the data packet; (iv) filtering the data packet to remove at least some information therein; (v) modifying contents of the data packet; (vi) notifying a security-related entity of the inconsistency; (vii) sending the data packet to the security-related entity; (viii) storing the data packet in a quarantine storage location; (ix) adding a "warning message" to the data packet; (x) sending the data packet to a next node; and/or (xi) sending the data packet to a previous node.

In some embodiments, resolution module 308, in response to the discrepancy determined in operation S265 above, adds a warning message, to the header of the data packet. The warning message serves to inform all subsequent nodes along the data packet's transmission path, including the destination node, that a malicious actor may have compromised (tampered with, altered, copied, and/or modified the transmission path and/or content, etc.) the integrity and/or security of the data packet. Subsequent nodes, including the destination node, may then, based on the warning message, handle the data packet in non-conventional way, or otherwise respond so as to mitigate, defeat, and/or counter any negative impact that may have been introduced by the malicious actor.

III. Further Comments and/or Embodiments

Some embodiments of the present invention may include one, or more, of the following features, characteristics, and/or advantages: (i) prevents network location spoofing; (ii) prevents network location characteristics spoofing; (iii) prevents spoofing of network headers; (iv) prevents malicious systems from fooling resource servers into accepting requests from unauthorized locations; (v) improves the level of trust and confidence in credentials; (vi) allows processes to recognize when credentials are erroneous and/or fraudulent; (vii) improves the trust in credentials in a network request through the application of a cryptographic function, using for instance, new headers designed to work in conjunction with the "X-Forwarded-For" header; and/or (viii) can be used with a completely different set of headers. Further with respect to item (vii) above, "X-Forwarded-For" is one example showing that some embodiments of the present invention can be applied to, and work in conjunction with, existing standard headers.

Some embodiments of the present invention enable verification of a particular data transmission path taken over a network by, for example, a data packet, a data file, a message, a client-server request or reply (collectively hereinafter referred to as "data", a data packet, or a "request"). The transmission path verification information (sometimes herein referred to as a transmission path dataset) can take several forms. In some embodiments, the transmission path verification information comprises an ordered list of network identifiers, such as host names, internet protocol (IP) addresses, media access control addresses (MAC addresses), etc., through which the data traversed in hopping from node to node during transit from the source node to the destination node.

In some embodiments, intermediate network locations (sometimes herein referred to as "intermediate nodes", "intermediate hops" or "intermediary proxies") between the source and destination add supplemental information to the message to, inter alia, determine, verify, add to, and attest to the route taken by the message. Each intermediate node adds supplemental information to the message. The supplemental information thus builds up incrementally as the message passes from one intermediate node to the next (intermediate hops), until it reaches the destination. In some embodiments, supplemental information includes network identifiers, random numbers (nonces and challenge values), intended next recipients, previous hops, and verifying information (such as message authentication codes, digital signatures, zero knowledge proof protocols, or other forgery-resistant cryptographic techniques). An intermediate node can be a router, a gateway, a server, or any other network device (real—implemented in hardware; virtual—implemented in software; or implemented in a combination of both hardware and software) that receives the data packet and forwards it to a next destination (another intermediate node or the destination node).

In some embodiments, source nodes (source locations), intermediate nodes, and destination nodes operate in concert such that the destination node (destination location) can verify, with a certain level of confidence, that data received at the destination node has followed a certain route through the network (network path). Given knowledge of the route thus recorded in the header, the destination location can then decide how to process the received data—for example, whether to trust it, reject it, deny it, ignore it, request re-transmission, filter the message, re-route the message, accept the message, take corrective action, and/or take any other course of action. Data may be rejected if, for example, it had transited through a legal jurisdiction over which it should not have been transmitted. Data may be assessed as to whether it had gone through proper threat-detection, data scrubbing, or firewall network paths.

A request issued by a source node in a distributed network sometimes travels through many intermediate hops on its path to a destination node. The path taken may not be known in advance, as routing decisions may be made independently by network routers along the way, sometimes based on considerations related to load balancing, bottlenecks, outages, and/or cost, etc. Some embodiments of the present invention ensure that a request has traveled over and through only trusted, or certain intermediate hops, to prevent network identifier spoofing, concealment of transit through forbidden network paths or segments, and/or to ensure that certain expected, desired and/or required intermediate paths were used.

Some embodiments of the present invention may recognize one, or more, of the following facts, potential problems, and/or potential areas for improvement with respect to the current state of the art: (i) some existing networking technologies, even when such information about intermediate hops are included, may be vulnerable to making up, replacing, modifying, or removing information concerning a network path that was traversed; and/or (ii) such fraudulent modifications may be made by any node including the source node and/or any intermediate node.

Some embodiments of the present invention detect such fraudulent modifications and prevent them from being allowed or otherwise tolerated.

Some embodiments of the present invention define the following fields within a request header: (i) source network identifier; (ii) destination network identifier; (iii) traversed path list (an ordered list of each of the network identifiers of the intermediate hops through which the request has transited); and/or (iv) verification information list (an ordered list of verification information added by the source, and each intermediate node through which the request has transited).

For simplicity in describing embodiments of the present invention, extensive references are made herein to a request "header" (also called a data packet "header"). However, these references encompass not only a request header, but a trailer as well. Aspects of embodiments of the invention may apply solely to a request header, solely to a request trailer, or to both the header and trailer. Further, for purpose of description, the "header" and "trailer" need not be restricted to the head or the tail of a request, but may refer to, be applied at, or be placed at any location within the request.

Actions performed by various nodes in the transmission path of a data packet are explained below, under the headings: (A) Actions performed by source node, (B) Actions performed by intermediate node, (C) Actions performed by destination node, and (D) Defensive Mechanisms.

(A) Actions Performed by Source Node.

In some embodiments of the present invention, a source node, once it generates (or otherwise obtains) a request for transmission to a destination, performs the following actions and updates the request header as follows: (i) adds a specification of the "source" network identifier; (ii) adds a specification of the "destination" network identifier; (iii) creates a "traversed path list" which includes the next network location through which the request will transit (that is, the first intermediate hop; (iv) generates and includes verification information attesting to the information in the request and the request header (that is, the source digitally signs the information with a private key and includes the digital signature along with it's digital certificate as part of the verification information); and/or (v) forwards the request, to the first intermediate hop.

In some embodiments, the request is transmitted, via a packet switched network, as a plurality of data packets, where the source node performs the actions discussed in the previous paragraph above, for each data packet. Each data packet travels independently to the destination node and may follow the same or different paths as other data packets. For simplicity in describing embodiments of the present invention, the request is considered to be a complete (stand-alone) request message such as a hypertext transfer protocol (http) request message. However, actions described with respect to a source node (discussed above), an intermediate node and/or destination node (discussed below) apply equally to a stand-alone request message as to a data packet portion of a request message or a data file transfer. All of these will be hereinafter referred to as the "data" or a "request".

(B) Actions Performed by Intermediate Node.

In some embodiments of the present invention, an intermediate node receives a request from a source node or from the previous intermediate node (the "prior sender"). The intermediate node verifies the request, updates the request header, and forwards the request to the next intermediate node or to the destination node.

The intermediate node performs the following operations to verify the request: (i) verifies that the last network identifier in the traversed path list equals the network identifier of the previous intermediate node; (ii) verifies that the second to last network identifier in the traversed path list (or the source network identifier if the network path list has only one entry) equals the network identifier of the "prior sender"; (iii) verifies, for each entry in the verification information list, that the verification information is consistent and correct for the entity which should have produced it (according to the corresponding positions in the traversed path list); and/or (iv) verifies the network path list against any external requirements (such as, for instance, no untrusted or invalid routes were taken, and/or required routes were taken).

The intermediate node updates the request header as follows: (i) adds the next intermediate node's network identifier to the traversed path list (or adds the destination network identifier if the next hop is last one); and/or (ii) generates and includes verification information, attesting to the information in the request and the request header (that is, the intermediate hop digitally signs the information with a private key and includes the digital signature along with its digital certificate as part of the verification information).

The intermediate node forwards the request to the next intermediate node, or to the destination node if the next hop is the last one.

(C) Actions Performed by Destination Node.

In some embodiments of the present invention, the destination node receives a request from the last intermediate node, verifies the request, and selects a responsive action based on the outcome of the verification process.

The destination node performs the following operations to verify the request: (i) verifies that the last network identifier in the traversed path list equals the network identifier of the destination node; (ii) verifies that the second to last network identifier in the traversed path list equals the network identifier of the last intermediate node; (iii) verifies, for each entry in the verification information list, that the verification information is consistent and correct for the entity which should have produced it (according to the corresponding positions in the traversed path list); (iv) verifies the network path list against any external requirements (such as, for instance, that no untrusted or invalid routes were taken, and/or that required routes were taken).

Based on the outcome of the verification process, the destination node selects a responsive action. If the destination node determines that the verification is successful, it may assign a "trusted" status to the data packet, accept and process the request, provided it meets normal processing requirements (such as being authenticated, authorized, and sufficient resources exist to process the request, etc.).

If the destination node, or any intermediate node, determines that the verification is not successful, it may reject the request, deny it, ignore it, request re-transmission, filter the request, re-route the request, take a corrective, and/or any other, course of action.

(D) Defensive Mechanisms.

A source node generates and sends to a destination node, a request. In some embodiments of the present invention, the source node, and each successive intermediate node along the way toward the destination node, adds to a chain of cryptographically secured verification information in the request header. The source node initiates the chain and intermediate nodes add to it based on the network path taken as well as previous information in the chain. The verification information added at each stage asserts and attests to the next destination within the network path list. Each intermediate node and the destination node verifies that no intermediary has modified previous entries existing in the header chain before forwarding it to the next intermediary. If an intermediate or destination node is unable to successfully verify information in the chain, the node rejects or drops the request, based on any governing security policy. In some embodiments, upon verification failure at an intermediate or destination node, the node records audit records and/or issues flags to trigger investigation.

Figure 4:
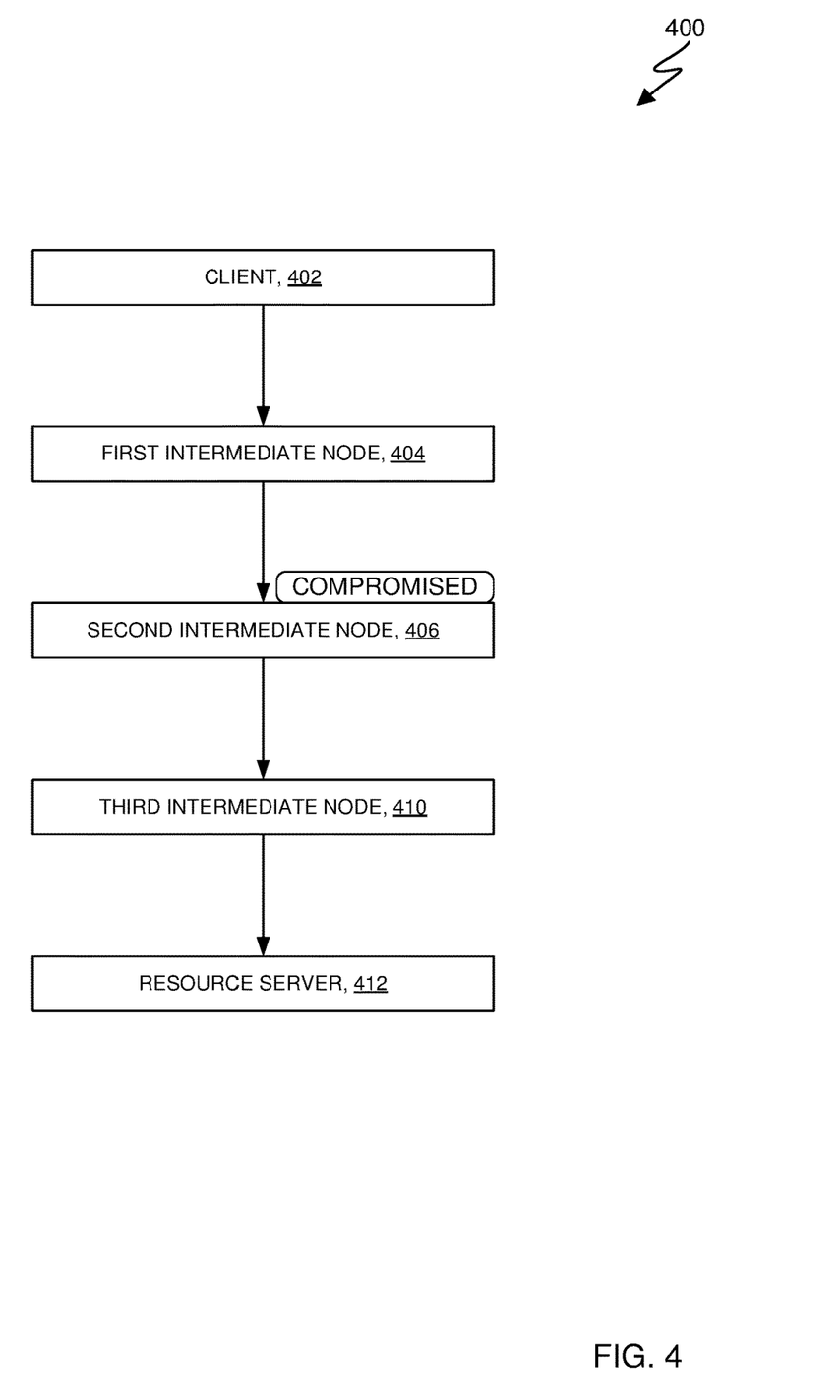
FIG. 4 is a flowchart showing a first network transmission path in accordance with at least one embodiment of the present invention.
Figure 5:
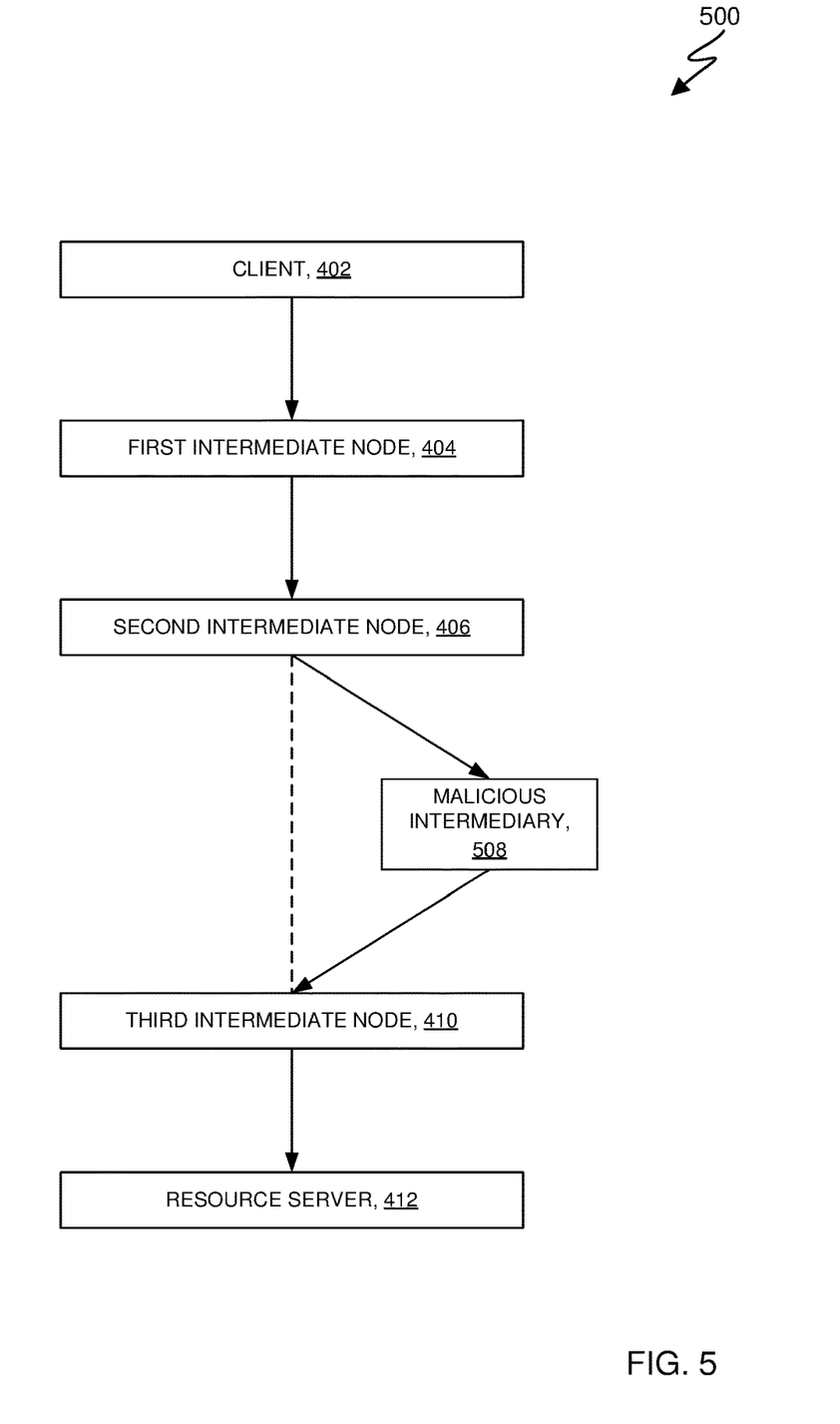
FIG. 5 is a flowchart showing a second network transmission path in accordance with at least one embodiment of the present invention.

Flowcharts 400 and 500, respectively of FIGS. 4 and 5, illustrate examples of two attack modes that are detected by some embodiments of the present invention. Flowchart 400 shows an example where a single node, through which a request transits, has been compromised. Flowchart 500 shows an example where a request gets detoured through a malicious intermediate node, outside the legitimate network path, and then resumes transit on the legitimate path.

As shown in flowchart 400, a request originates at client 402. Client 402 sends the request to resource server 412, the destination. The request transits through first intermediate node 404, second intermediate node 406, third intermediate node 410, and finally arrives at resource server 412. Second intermediate node 406 has been compromised by an attacker.

With only one node compromised, any modification of the network path can be detected, at least by the next node in the path following the compromised node. In this example, since second intermediate node 406 has been compromised, third intermediate node 410 detects that the request has been compromised.

If the attacker, in control of second intermediate node 406, tries to relay the packet through an untrusted intermediary (see malicious intermediary 508 of flowchart 500 of FIG. 5) for example to modify the request, third intermediate node 410 detects that the node from which it received the request (malicious intermediary 508) does not match the node cryptographically encoded in the last entry of the traversed path list (second intermediate node 406). The mismatch is due to the fact that the malicious intermediary 508 (FIG. 5) would not be able to create a trusted signature and add itself to the traversed path list. Malicious intermediary 508 could add the correct headers and create a digital signature for the list, but third intermediate node 410 would not trust malicious intermediary 508 to generate a trusted signature on the path. If malicious intermediary 508 tried to use second intermediate node 406's credentials to create a signature, third intermediate node 410 would recognize that the request did not come from the address associated with second intermediate node 406. For example, in some embodiments, the IP address is tied to second intermediate node 406's credentials such as adding it as a field to a digital certificate. Thus, even with a correct signature in place, third intermediate node 410 is still able to detect the deviation in the path.

Some embodiments of the present invention extend existing standards, for example, without limitation, the Forwarded HTTP Extension defined in RFC 7239, and HAProxy which introduces an alternative to Forwarded HTTP Extension. These, and other existing standards, could be enhanced to leverage embodiments of the present invention. Some embodiments can be applied to Forwarded HTTP Extension and HAProxy, and other standards, to improve trust in the path attested to in any request.

The following example pertains to application of embodiments of the present invention with respect to Forwarded header, as specified in the June 2014 update where X-Forwarded-For header was replaced by the Forwarded header with key value pairs. For the purpose of this discussion the term intermediary proxy is where an intermediary hop is performed as specified in the Definitions sub-section of this Detailed Description section. The term intermediary proxy is introduced in the example to help map concepts in the example to RFC 7239.

X-Forwarded-For.

RFC 7239 describes a way to disclose network information lost when intermediary proxies are used with HTTP requests. This assures that any component in the proxy chain has access to information about what proxies were used during the transmission of a HTTP request.

Some embodiments of the present invention require that Forwarded headers, of RFC 7239, are required when implementing a trusted path in accordance with embodiments of the present invention. In some embodiments, an intermediary server adheres to RFC 7239 with the following additions to the "Forwarded" header:

(i) Clients and proxies add, to the "forwarded header", one or both of a new "forwarded for destination" key value pair "dest=<IP address>" or "dhost=<hostname>". In the case of "forwarded for destination" key value pair "dest=<IP address>", the destination is the address where the proxy sends the request. In the case of "forwarded for destination" key value pair "dhost=<hostname>", the hostname pertains to the host to which the clients and proxies send the request.

(ii) Clients and proxies add a new "forwarded for" nonce key value pair "nonce=<nonce>" to the "forwarded header".

The key value pairs of items (i) and (ii) above are added to the information that comprises one of the list entries for the "Forwarded" header specified in RFC 7239.

(iii) In addition to the key value pairs described in (i) and (ii) above, clients and proxies add a new header "X-Forwarded-Sig", which is a list of digital signatures created as the request moves through the network. The header signature calculation is explained in the following few paragraphs.

The signature header is calculated by concatenating the Forwarded header, after intermediary proxy or client updates, with any existing values in X-Forwarded-For-Sig. That signature is then appended to the list already present in the X-Forwarded-For-Sig header, in some embodiments by a comma and a space.

In some embodiments, an entity that terminates a network session (HTTP session in this example) but still needs to pass the client's request to another entity, updates information in the Forwarded header and the X-Forwarded-Sig header, before forwarding the request to other intermediary proxies and/or the final destination. In order to validate the identity of an intermediary, some embodiments allow for an additional header, X-Forwarded-For-Identity, where a trusted token such as an X509 certificate can be used to verify ownership of keys used to create the X-Forwarded-For-Sig values. The trusted token should have enough information to identify which intermediary proxy or client of which it is attesting the identity. To decrease the header size, some embodiments use alternate mappings to identities which can be used to look up identities used in the headers.

To calculate signatures used to protect the request path, some embodiments apply the following rules:

(i) The client who originates a request adds a nonce and destination key value pair to the Forwarded header. The client adds this information to assure there were no intermediaries between the client and the first intermediary listed in the Forwarded header.

(ii) The client calculates the signature of Forwarded header and places it as the first entry to the X-Forwarded-For-Sig header.

(iii) Intermediaries verify that their address is the value of the destination key value pair of last entry in the Forwarded header (iv) Intermediaries create a Forwarded header entry with by, for, proto, host, dest, dhost and nonce key value pairs and append it to the Forwarded header.

(v) The intermediaries add a new X-Forwarded-For-Sig entry by signing the concatenation of the Forwarded headers and existing values in the X-Forwarded-For-Sig.

This concatenation methodology allows any entity in the chain (network path) to validate that the network path has not been modified by any previous intermediary.

Some embodiments of the present invention may include one, or more, of the following features, characteristics, and/or advantages: (i) generates a list of verifiable signature that can be used to validate a network path; (ii) cryptographically attests as to a data packet originating node; (iii) cryptographically validates that the data packet sources are trusted to transmit; and/or (iv) cryptographically verifies routing of data packets.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Network Identifier: a unique identifier for a location on a network (for example internet protocol (IP) address, host name, media access control (MAC) address.

Request: a message transmitted over the network which requests access to some resources of another entity on the network.

Request Header: supplemental information which is embedded in, or accompanies, the request, and which can be modified during the course of the request's transmission through the network.

Source/source node: a location on a network from which a request or data packet originates; in a client/server context, when a client sends a request to a server, the client is the source node; when the server sends a response back to the client, the server is the source node.

Intermediate hop/intermediate node (synonymous): a location on a network which passes a request from one location to another, sitting somewhere between the source and destination along the network path.

Destination/destination node: a location on a network which is the intended recipient of a request or data packet; in a client/server context, a server controls access to resources to which the client requests access; when the client sends the request to the server, the server is the destination; when the server sends a response to the client, the client is the destination.

Verification Information: information that, via cryptographic or mathematical means, is difficult to create fraudulent versions thereof (for example, digital signatures, zero knowledge proof protocols, message authentication codes, etc.), together with associated information needed to perform verification, such as public keys, digital certificates, random challenge values, random nonce values, time stamps, common reference strings, etc.

HTTP: HyperText Transfer Protocol.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer implemented method comprising:
   receiving, by a second node, and through a network from a previous node, a data packet comprising:
      a cryptographically secured first node identity information that identifies a first node from which the data packet was directed to the second node,
      a first instance of cryptographically secured second node identity information that identifies the second node to which the first node directed the data packet, and
      a previous node identity information indicating the identity of the previous node;
   determining an inconsistency wherein the first node identity information does not correspond to the previous node identity information, wherein the inconsistency is based only on the previous node identity information not including a trusted signature comprising an IP address included in the first instance of cryptographically secured second node identity information; and
   in response to determining the inconsistency, performing a responsive action.

2. The method of claim 1, wherein the responsive action is selected from the group consisting of:
   rejecting the data packet;
   (ii) dropping the data packet;
   (iii) sending, to a source node, a request to re-transmit the data packet;
   (iv) filtering the data packet to remove at least some information therein;
   (v) modifying contents of the data packet;
   (vi) notifying a security-related entity of the inconsistency;
   (vii) sending the data packet to the security-related entity;
   (viii) storing the data packet in a quarantine storage location;
   (ix) adding a "warning message" to the data packet;
   (x) sending the data packet to a next node; and
   (xi) sending the data packet to the previous node.

3. The method of claim 1, wherein the data packet includes a header comprising:
   a transmission path dataset comprising an ordered list of network nodes, including a source node and zero or more intermediate network nodes through which the data packet has transited; and
   a verification information dataset comprising an ordered list of verification attestations, respectively added by each node listed in the transmission path dataset; wherein:
   the ordered list of network nodes respectively corresponds to the ordered list of verification attestations; and
   a verification attestation attests as to validity of a respectively corresponding network node listed in the transmission path dataset.

4. The method of claim 3, wherein the information in the verification information dataset is based on information selected from the group consisting of:
   a network identifier, a random number, a one-time value, a challenge value, an intended recipient, a network node identifier, a message authentication code, a digital signature, and results of a zero knowledge proof protocol.

5. The method of claim 3, wherein the verification information dataset comprises an indication that the cryptographically secured first node identity information is not consistent with, and does not correspond to the first node, based on information in a first position in the transmission path dataset, and information in a respectively corresponding first position in the verification information dataset.

6. A computer-implemented method comprising:
receiving, by a second node, and through a network from a previous node, a data packet comprising:
a cryptographically secured first node identity information that identifies a first node from which the data packet was directed to the second node,
a first instance of cryptographically secured second node identity information that identifies the second node to which the first node directed the data packet, and
a previous node identity information indicating the identity of the previous node;
determining:
(i) the cryptographically secured first node identity information is consistent with the previous node identity information,
(ii) the first instance of the cryptographically secured second node identity information is consistent with the identity of the second node based only on the previous node identity information including a trusted signature comprising an IP address included in the first instance of cryptographically secured second node identity information, and
(iii) a path taken by the data packet is verified; and
in response to determining (i), (ii) and (iii), performing a responsive action.

7. The method of claim 6, wherein the responsive action comprises:
generating a cryptographically secured first node verification information indicating that the identity of the first node is verified;
generating a second instance of cryptographically secured second node identity information;
generating a cryptographically secured third node identity information that identifies a third node to which the second node directs the data-packet;
adding to the data packet the cryptographically secured first node verification information, the second instance of cryptographically secured second node identity information, and the cryptographically secured third node identity information; and
sending the data packet to the third node.

8. The method of claim 6, wherein the data packet includes a header comprising:
a transmission path dataset comprising an ordered list of network nodes, including a source node and zero or more intermediate network nodes through which the data packet has transited; and
a verification information dataset comprising an ordered list of verification attestations, respectively added by each node listed in the transmission path dataset;
wherein:
the ordered list of network nodes respectively corresponds to the ordered list of verification attestations; and
a verification attestation attests as to validity of a respectively corresponding network node listed in the transmission path dataset.

9. The method of claim 8, wherein the information in the verification information dataset is based on information selected from the group consisting of: a network identifier, a random number, a one-time value, a challenge value, an intended recipient, a network node identifier, a message authentication code, a digital signature, and a zero knowledge proof protocol.

10. The method of claim 8, wherein the verification information dataset comprises an indication that the cryptographically secured first node identity information is consistent with, and corresponds, to the first node, based on information in a first position in the transmission path dataset, and information in a respectively corresponding first position in the verification information dataset.

11. A computer program product comprising a computer readable storage medium having stored thereon program instructions programmed to perform:
receiving, by a second node, and through a network from a previous node, a data packet comprising:
a cryptographically secured first node identity information that identifies a first node from which the data packet was directed to the second node,
a first instance of cryptographically secured second node identity information that identifies the second node to which the first node directed the data packet, and
a previous node identity information indicating the identity of the previous node; determining an inconsistency wherein the first node identity information does not correspond to the previous node identity information, wherein the inconsistency is based only on the previous node identity information not including a trusted signature comprising an IP address included in the first instance of cryptographically secured second node identity information; and
in response to determining the inconsistency, performing a responsive action.

12. The computer program product of claim 11 wherein, wherein the responsive action is selected from the group consisting of:
rejecting the data packet;
(ii) dropping the data packet;
(iii) sending, to a source node, a request to re-transmit the data packet;
(iv) filtering the data packet to remove at least some information therein;
(v) modifying contents of the data packet;
(vi) notifying a security-related entity of the inconsistency;
(vii) sending the data packet to the security-related entity;
(viii) storing the data packet in a quarantine storage location;
(ix) adding a "warning message" to the data packet;
(x) sending the data packet to a next node; and
(xi) sending the data packet to the previous node.

13. The computer program product of claim 11, wherein the data packet includes a header comprising:
a transmission path dataset comprising an ordered list of network nodes, including a source node and zero or more intermediate network nodes through which the data packet has transited; and
a verification information dataset comprising an ordered list of verification attestations, respectively added by each node listed in the transmission path dataset;
wherein:
the ordered list of network nodes respectively corresponds to the ordered list of verification attestations; and
a verification attestation attests as to validity of a respectively corresponding network node listed in the transmission path dataset.

14. The computer program product of claim 13, wherein the information in the verification information dataset is based on information selected from the group consisting of: a network identifier, a random number, a one-time value, a challenge value, an intended recipient, a network node identifier, a message authentication code, a digital signature, and results of a zero knowledge proof protocol.

15. The computer program product of claim 13, wherein the verification information dataset comprises an indication that the cryptographically secured first node identity information is not consistent with, and does not correspond to the first node, based on information in a first position in the transmission path dataset, and information in a respectively corresponding first position in the verification information dataset.

16. The computer program product of claim 11, wherein:
- the computer program product is a computer system; and
- the computer program product further comprises a processor set structured and/or connected in data communication with the storage medium so that the processor set executes computer instructions stored on the storage medium.

\* \* \* \* \*